Patented Jan. 3, 1950

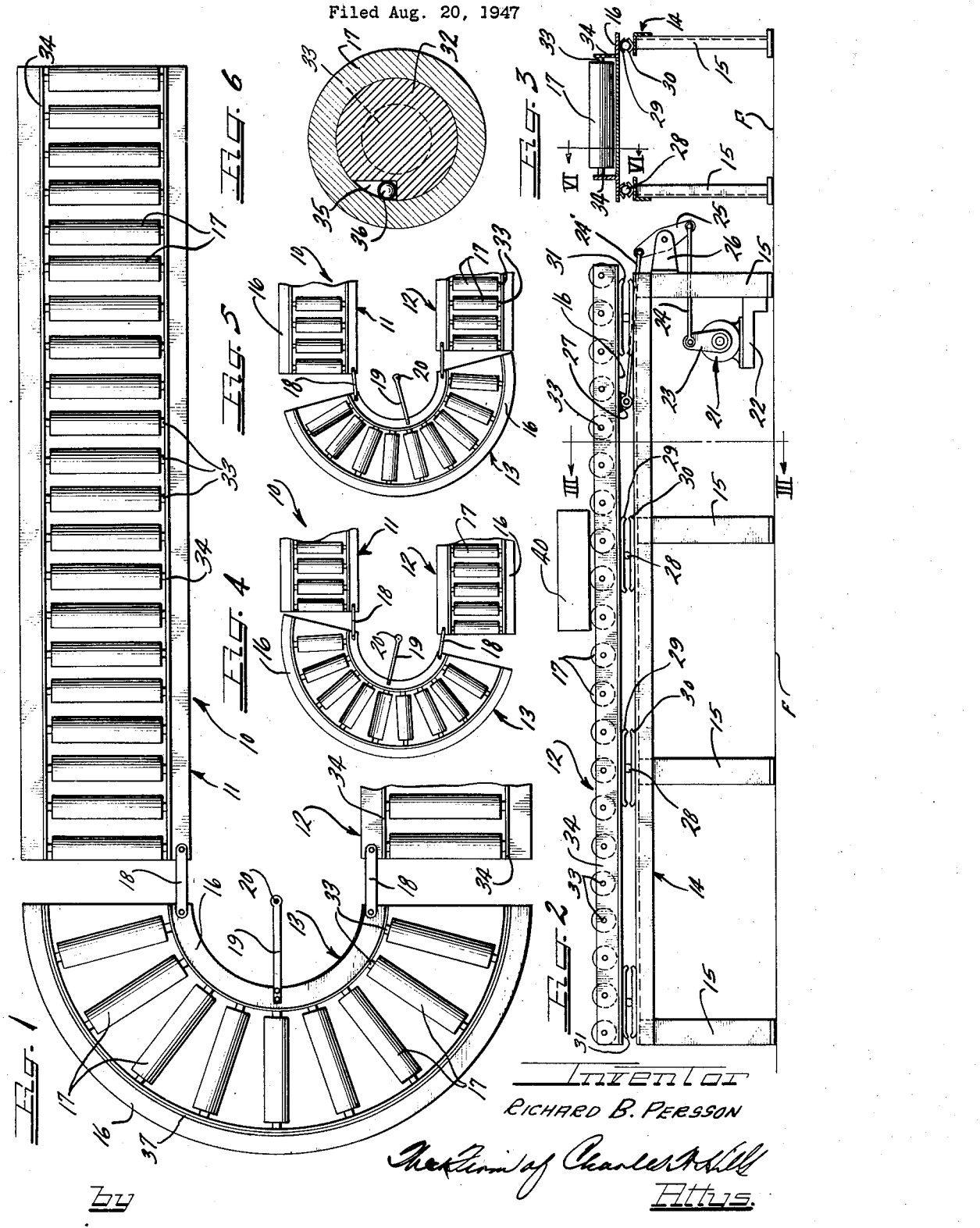

2,493,465

UNITED STATES PATENT OFFICE 2,493,465

POWER-DRIVEN CONVEYER

Richard B. Persson, Chicago, Ill., assignor of one-half to Per Persson, Chicago, Ill.

Application August 20, 1947, Serial No. 769,569

6 Claims. (Cl. 198—218)

1

This invention relates to a conveyor, and more particularly to a conveyor utilizing the inertia of the conveyed article to move the article along the conveyor.

In accordance with the principles of my present invention, I provide a reciprocating platform for conveying articles and individual rollers mounted on said platform which are capable of rotative movement about their own axes in one direction only. As the platform is moved in one direction, the individual rollers having articles resting thereon have a tendency to remain at rest or to rotate in the opposite direction relative to the platform; but since such relative movement is prevented, the articles will move with the platform. When the platform reverses direction, since the rollers are not prevented from rotation in the opposite direction, the articles, due to inertia, continue movement in the original direction of movement of the platform. The characteristics generic to my invention are a reciprocating platform having a plurality of individual units mounted thereon for unidirectional individual rotation about their own axes. A conveyor is thus provided that is so constructed as to move articles being conveyed forwardly continuously on both the forward and return strokes of the platform.

According to one embodiment of my invention, there is provided a multi-section roller conveyor, adjacent sections being loosely connected and curved sections being employed if desired. The rollers are mounted on moving platforms and are themselves rotatable about their own axes in one direction only. A simple crank arm linkage connected to one of the sections may supply all the necessary power for the entire system. No power is supplied to the rollers since rotation to move articles to be conveyed along the conveyor is produced by the inertia of the articles.

It is therefore an object of this invention to provide a conveyor depending on inertia of articles to be conveyed for moving the articles along the conveyor and which conveyor may cause articles to move forward continuously.

It is a further more specific object of the invention to provide a roller conveyor in which no power is supplied directly to the rollers, but power may be supplied through a simple linkage to a single point of the conveyor section.

2

It is a further specific object of the invention to provide a conveyor formed from a number of sections including arcuate sections which may be driven at a single point on one of the sections.

It is a still further object of the invention to provide a novel means of linking curved and straight sections so that each section may have a longitudinal reciprocating component of movement produced by power applied directly to only one section.

Other and further important objects of this invention will be apparent from the disclosure in the specification of the accompanying drawings.

On the drawings:

Figure 1 is a fragmentary plan view of a conveyor embodying the principles of my invention;

Figure 2 is a side elevational view of a straight section of the conveyor of Figure 1;

Figure 3 is a sectional view taken substantially along the line III—III of Figure 2;

Figure 4 is a fragmentary plan view on a reduced scale showing the conveyor of Figure 1 at the forward end of its strokes;

Figure 5 is a fragmentary plan view on a reduced scale of the conveyor of Figure 1 at the end of its backward stroke; and Figure 6 is a cross sectional view taken substantially along the line VI—VI of Figure 3.

The reference numeral 10 designates generally a U-shaped conveyor embodying the principles of my invention. Said conveyor is illustrated as made up of three sections, straight sections 11 and 12 and a curved section 13.

Each section comprises a stationary table 14 having a number of legs 15 resting on floor F, a movable platform 16 and a plurality of rollers 17 carried by each platform. The ends of adjacent straight and curved sections are loosely connected by links 18 pivotally secured to the inner edges of the connected ends. A pivot bar 19 is fixedly secured to the curved section 13 for guiding the curved section in curved movement about a pivot axis 20 as the straight section 12 is reciprocated.

The reciprocation of section 12 is accomplished by means of a motor 21 mounted on a support 22 which in turn may be connected to a pair of legs 15. The driving linkage comprises a crank 23 rotatable with the motor shaft, a rod 24 extending to one end of a rocker arm 25 pivotally carried by a bracket 26 mounted on a leg 15. To the other end of the rocker arm 25 is pivotally connected a second rod 24' extending to an ear 27 carried by movable platform 16 and pivotally connected thereto. Thus as crank 23 is rotated, the linkage converts the rotation into reciprocating movement of the platform 16.

The platform 16 is movable by virtue of the arrangement of balls 28 riding in upper and lower channels 29 and 30 of the platform and table, respectively, as best seen in Figures 2 and 3. The channels are of V-cross section (Figure 3) and have inturned ends 31 (Figure 2) to confine the balls 28 therein.

Referring to Figures 1, 2, 3 and 6, it will be seen that the rollers 17 are rotatably mounted upon cores 32 having end stub shafts 33 fixedly secured in the side walls 34 of the platform 16. Referring to Figure 6, it will be seen that each core 32 has a wedge shaped recess 35 therein receiving a ball 36. It will be apparent that the ball will prevent rotation of the roller in a clockwise direction, as viewed in Figure 6, but will permit free rotation counterclockwise as seen in Figure 6. Thus if the crank 23 rotates clockwise (Figure 2), the platform will first move to the left. An article 40 to be conveyed would thus tend to move to the right relative to the rollers or due to inertia to rotate the rollers clockwise as seen in Figures 2 and 6. Since the rollers are locked against rotation in this direction, the article will move forward to the left (Figure 2). However, when the platform reverses direction and starts moving to the right (Figure 2), the articles tend to continue movement to the left exerting a counterclockwise torque on the rollers. The rollers are free to rotate in this direction and the article continues forwardly relative to the rollers and with respect to the table for at least part of the return stroke, the amount depending on the acceleration and rotational inertia of the rollers.

The curved section 13 is illustrated as being semi-circular, but this is merely by way of example. Figures 4 and 5 depict the terminal positions of the curved section 13 as the platform of section 12 is reciprocated. Figure 1 indicates the intermediate or mid position of the curved section.

In the present embodiment the pivot bar 19 is pivoted at the origin of the radii of curvature of the edges of the platform, so that the channels are the same as those shown for the straight section, except they are curved concentrically about the pivot bar axis 20. Inasmuch as when the articles are subjected to circular movement, they will tend to continue on a tangent when the direction of movement is reversed, it is desirable to provide a shield such as 37 to constrain the conveyed articles within the limits of the rollers. The gaps between the end rollers of the sections and between adjacent rollers of the sections must, of course, be sufficiently small so that the articles will not fall therebetween. The tendency of the articles to continue on a tangent in circular motion resolves into an arcuate component forwardly about the curved section and one normal thereto which is resisted by shield 37. Thus the resultant motion of the article will be forwardly along the rollers of the curved section.

The specific means for preventing rotation of the rollers in one direction is, of course, not limited to the wedge recess and ball described above, since such means may also comprise a ratchet, roller or any other type locking device. Also the mounting of the platform on the table may be modified by employing flexible stilts or rollers, for example.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A conveyor comprising a stationary table, a platform mounted for reciprocating movement on said table, a plurality of rollers mounted on said platform to form an article conveying surface, each of said rollers being fixedly positioned relatively to the others and being mounted for rotation about its own axis, means for insuring free rotation of said rollers in one direction only and means for reciprocating said platform on said table, whereby on the forward stroke of said platform articles thereon are moved forwardly with the rollers by virtue of the friction between said articles and the non-rotating rollers, and when the platform moves rearwardly the articles continue to move forwardly over the freely rotating rollers.

2. A conveyor comprising a platform, means for driving said platform in a generally reciprocating motion, a plurality of rollers mounted on said platform for rotation about their own axes, each of said rollers being fixedly positioned relatively to the others, and means for substantially insuring rotation of said rollers in one direction only, whereby when said platform is reciprocated on the forward stroke articles thereon are moved forwardly with the rollers by virtue of the friction between said articles and the non-rotating rollers, and when the platform moves rearwardly the articles continue to move forwardly over the freely rotating rollers.

3. A conveyor comprising a stationary table, a platform mounted for reciprocating movement on said table, a plurality of rollers mounted on said platform for rotation about their own axes, means including a wedge-shaped recess and ball associated with said rollers for substantially insuring rotation of said rollers in one direction only, whereby when said platform is reciprocated on the forward stroke articles thereon are moved forwardly with the rollers and when the platform moves rearwardly the articles continue to move forwardly over the freely rotating rollers.

4. A conveyor comprising straight sections and curved sections, each section comprising a stationary table and a reciprocating platform, said platforms having a plurality of rollers mounted thereon for rotation about their own axes in one direction only, a loose connecting link between adjacent ends of sections and a pivot bar attached to the curved section so that only one driving means need be applied to only one section of the conveyor for operating the entire conveyor.

5. A conveyor comprising a stationary table, a platform mounted for reciprocating movement on said table, a pair of opposed V-shaped channels mounted respectively on said table and on said platform and a ball riding therebetween for guiding said platform in its reciprocating movements relative to said table, a plurality of rollers mounted on said platform to form an article conveying surface, each of said rollers being fixedly positioned relatively to the others and being mounted for rotation about its own axis, and means for substantially insuring rotation of said rollers in one direction only.

6. A conveyor comprising a stationary table, a platform mounted in sections for reciprocating movement on said table, a plurality of units mounted on said sections for individual rotation about their own axes in one direction only, and linkage means for reciprocating said sections on said table for conveying articles over said units, said linkage means being constructed and arranged so as to require the application of a driving force only to one section to reciprocate the entire platform.

RICHARD B. PERSSON.

REFERENCES CITED

The following references are of record in the file of this patent:

UNITED STATES PATENTS

| Number | Name | Date |
| --- | --- | --- |
| 379,704 | Krause et al. | Mar. 20, 1888 |
| 1,462,511 | Lister | July 24, 1923 |
| 1,807,110 | Walter | May 26, 1931 |